United States Patent
Coulson et al.

(10) Patent No.: US 8,370,735 B2
(45) Date of Patent: Feb. 5, 2013

(54) EFFICIENT, NON-BLOCKING MECHANISM FOR INCREMENTALLY PROCESSING ARBITRARY SIZED XML DOCUMENTS

(75) Inventors: Michael J. Coulson, Clyde Hill, WA (US); Erik Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 12/147,516

(22) Filed: Jun. 27, 2008

(65) Prior Publication Data
US 2009/0327861 A1  Dec. 31, 2009

(51) Int. Cl.
*G06F 17/00* (2006.01)
(52) U.S. Cl. ........................ 715/234; 715/200
(58) Field of Classification Search ................. 715/200, 715/234; 718/102
See application file for complete search history.

(56) References Cited

U.S. PATENT DOCUMENTS

| | | | |
|---|---|---|---|
| 6,631,379 B2 | 10/2003 | Cox | |
| 6,725,233 B2 | 4/2004 | Froyd et al. | |
| 6,880,125 B2 | 4/2005 | Fry | |
| 7,191,186 B1 | 3/2007 | Pullen | |
| 7,289,973 B2 | 10/2007 | Kiessig et al. | |
| 7,844,956 B2 * | 11/2010 | Rojer | 717/136 |
| 2005/0086584 A1 | 4/2005 | Sampathkumar et al. | |
| 2005/0203957 A1 | 9/2005 | Wang et al. | |
| 2007/0299811 A1 | 12/2007 | Chandrasekar et al. | |
| 2008/0010629 A1 | 1/2008 | Berg et al. | |
| 2008/0244586 A1 * | 10/2008 | Hopp | 718/102 |

OTHER PUBLICATIONS

Elliotte Rusty Harold, Processing XML with Java, 2002, cafeconleche, pp. 59.*
"Elias Ross," E-XML Library: For XML, XML-RPC, HTTP, and related, 2002. http://e-xml.sourceforge.net/source/e-xml/README.txt.
"Home Page of XML Pull Parser (XPP)" http://www.extreme.indiana.edu/xgws/xsoap/xpp/, Jan. 14, 2008.
"Simple Plain Xml Parser" http://code.google.com/p/spxml/, Jan. 14, 2008.
"Streaming API for XML" http://jcp.org/en/jsr/detail?id=173, Jan. 14, 2008.

* cited by examiner

*Primary Examiner* — Manglesh M Patel
(74) *Attorney, Agent, or Firm* — Microsoft Corporation

(57) ABSTRACT

Reader and writer XML processing APIs may process XML documents without blocking a thread by initiating any potential I/O necessary prior to reading from or writing to the XML processing API and by providing a callback which may be notified when the I/O, if any, is complete. The XML processing API may be able to simultaneously process multiple XML documents in various formats and sizes.

20 Claims, 9 Drawing Sheets

800

| Time | Thread1 | Thread2 |
|---|---|---|
| 0 | Fill(document1) | \<idle\> |
| 1 | WriteStartElement (document2) | \<idle\> |
| 2 | WriteString(document2) | \<Fill(document1) Complete\> |
| 3 | WriteEndElement (document2) | ReadStartElement (document1) |
| 4 | Flush(document2) | ReadString(document1) |
| 5 | WriteStartElement (document3) | ReadEndElement(document1) |
| 6 | WriteString(document3) | Fill(document4) |
| 7 | WriteEndElement (document3) | \<Flush(document2) Complete\> |
| 8 | Flush(document3) | \<Fill(document4) Complete\> ReadStartElement (document4) |
| 9 | \<idle\> | |
| 10 | \<idle\> | ReadString(document4) |
| 11 | \<idle\> | ReadEndElement(document4) \<Flush(document3) |
| 12 | \<idle\> | Complete\> |

```
300 void ReadExample1()
{                                           205
305  reader.ReadStartElement("orders");
     for each (product in products)
     {                                      215
        reader.ReadStartElement("Order");
        reader.ReadString(product);
        reader.ReadEndElement();
     }                        210
     reader.ReadEndElement();
}
```

Fig. 3a

```
350 void WriteExample1()
{                                           205
355  writer.WriteStartElement("orders");
     for each (product in products)
     {                                      215
        writer.WriteStartElement("Order");
        writer.WriteString(product);
        writer.WriteEndElement();
     }                        210
     writer.WriteEndElement();
}
```

Fig. 3b

```
void ReadExample2()      400
{         410   415
405   reader.Fill(128);                    205
      reader.ReadStartElement("Orders");
          410   425
405   reader.Fill(1024);
      for each (product in products)
      {
          reader.ReadStartElement("Order");
                      430
          reader.ReadString(product);
          reader.ReadEndElement();
      }   410   435
      reader.Fill(64);
      reader.ReadEndElement();
}
```

Fig. 4a

```
void WriteExample2()   450
{                                    205
455   writer.WriteStartElement("Orders");
          460   465
      writer.Flush(128);
      for each (product in products)
      {
          writer.WriteStartElement("Order");
                      430
          writer.WriteString(product);
          writer.WriteEndElement();
          writer.Flush(1024);
      }       460    470
      writer.WriteEndElement();
      writer.Flush(64);
}                      475
```

Fig. 4b

```
void ReadExample3()                500
{          510   515    520
505   reader.Fill(128, Read3A);
}
                520
void Read3A()
{                                      205
505   reader.ReadStartElement("Orders");
    Read3B();
}        525
         525
void Read3B()
{        510  530    535
505   reader.Fill(1024, Read3C);
}
         535
void Read3C()
{
    for each (product in products)
    {
        reader.ReadStartElement("Order");
        reader.ReadString(product);
        reader.ReadEndElement();
        Read3B();
    }     525
    else
    {
        Read3D();
    }   540
} void Read3D()
{    540
    reader.Fill(64, Read3E);
}           545 void Read3E()
{    545
    reader.ReadEndElement();
}
```

Fig. 5a

```
                            550
        void WriteExample3()
        {
555 ─── writer.WriteStartElement("Orders");
           writer.Flush(128, Write3A);
        }         └─560  └─565    └─570

┌─570
        void Write3A()
        {
           for each (product in products)
           {
              writer.WriteStartElement("Order");
              writer.WriteString(product);
              writer.WriteEndElement();
              Write3B();
           }          └─575
           else
           {
              Write3C();
           }     └─580
        } void Write3B()
        {      └─575
           writer.Flush(1024, Write3A);
        }                       └─570 void Write3C()
        {      └─580
           writer.WriteEndElement();
           writer.Flush(64);
        }
```

| Time | Thread1 | Thread2 |
|---|---|---|
| 0 | Fill(document1) | <idle> |
| 1 | WriteStartElement (document2) | <idle> |
| 2 | WriteString(document2) | <Fill(document1) Complete> ReadStartElement |
| 3 | WriteEndElement (document2) | (document1) |
| 4 | Flush(document2) | ReadString(document1) |
| 5 | WriteStartElement (document3) | ReadEndElement(document1) |
| 6 | WriteString(document3) | Fill(document4) |
| 7 | WriteEndElement (document3) | <Flush(document2) Complete> |
| 8 | Flush(document3) | <Fill(document4) Complete> ReadStartElement |
| 9 | <idle> | (document4) |
| 10 | <idle> | ReadString(document4) |
| 11 | <idle> | ReadEndElement(document4) <Flush(document3) |
| 12 | <idle> | Complete> |

Fig. 8

EFFICIENT, NON-BLOCKING MECHANISM FOR INCREMENTALLY PROCESSING ARBITRARY SIZED XML DOCUMENTS

BACKGROUND

This Background is intended to provide the basic context of this patent application and is not intended to describe a specific problem to be solved.

In the network environment of modern computing, portable data, documents, and applications are ubiquitous. One component of creating truly portable data and documents for portable applications is that they are extensible. For example, the data and documents for portable applications should be easily customizable to add new functions and modify the behavior of existing functions for a wide variety of applications. Extensible Markup Language (XML) is an adaptable way to create common information formats and share both the format and the data across networks such as the World Wide Web and intranets. In a common scenario, developers may agree on a standard method to describe the information about a computer hardware component (e.g., processor performance, memory, etc.). The developers may then describe the component information format with XML. Standardizing the information description enables all users to send and retrieve data about the component or incorporate the component into various applications without specific knowledge of the component's description. Thus, XML can be employed to consistently and reliably share information.

XML is similar to Hypertext Markup Language, HTML, as both XML and HTML contain markup symbols to describe the contents of a page or file. XML, however, is not a markup language, but rather, a "metalanguage" used to create other specialized languages. XML provides an approach to define complex documents and data structures (e.g., invoices, molecular data, news feeds, glossaries, inventory descriptions, real estate properties, etc.). As long as the XML definition (i.e., the "schema") for a collection of data is available, developers are able to create applications to reliably process any data formatted according to those rules.

I/O operations, such as reading from or writing to a disk, or other system calls, are typically employed to process digital documents, including XML documents. To process an XML document or other digital document, the execution threads that perform the processing operations of a computer are usually unable to complete any other document processing until an I/O operation completes. In other words, the threads required to process the XML document (e.g., XML process-specific threads, etc.) are blocked once I/O begins, and cannot continue processing until the I/O system thread returns. In the intervening period, the entire document processing operation is blocked by the kernel and cannot run, which may significantly delay execution or starve other XML processing threads.

Therefore, past methods for XML document processing that include I/O have had the unwanted effect of significantly limiting the scalability of XML document processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Reader and writer XML processing APIs may process XML documents without blocking a thread by initiating any potential I/O necessary prior to reading from or writing to the XML processing API and by providing a callback which may be notified when the I/O, if any, is complete. The XML processing API may be able to simultaneously process multiple XML documents in various formats and sizes.

BRIEF DESCRIPTION OF THE FIGURES

FIGS. 3a and 3b may be an illustration of pseudo-code of a method for XML document read and write processing;

FIGS. 4a and 4b may be an illustration of pseudo-code of another method for XML document read and write processing;

FIGS. 5a and 5b may be another illustration of pseudo-code of yet another method for XML document read and write processing;

FIG. 8 may be an illustration of a timeline of two execution threads processing four documents simultaneously and in parallel.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
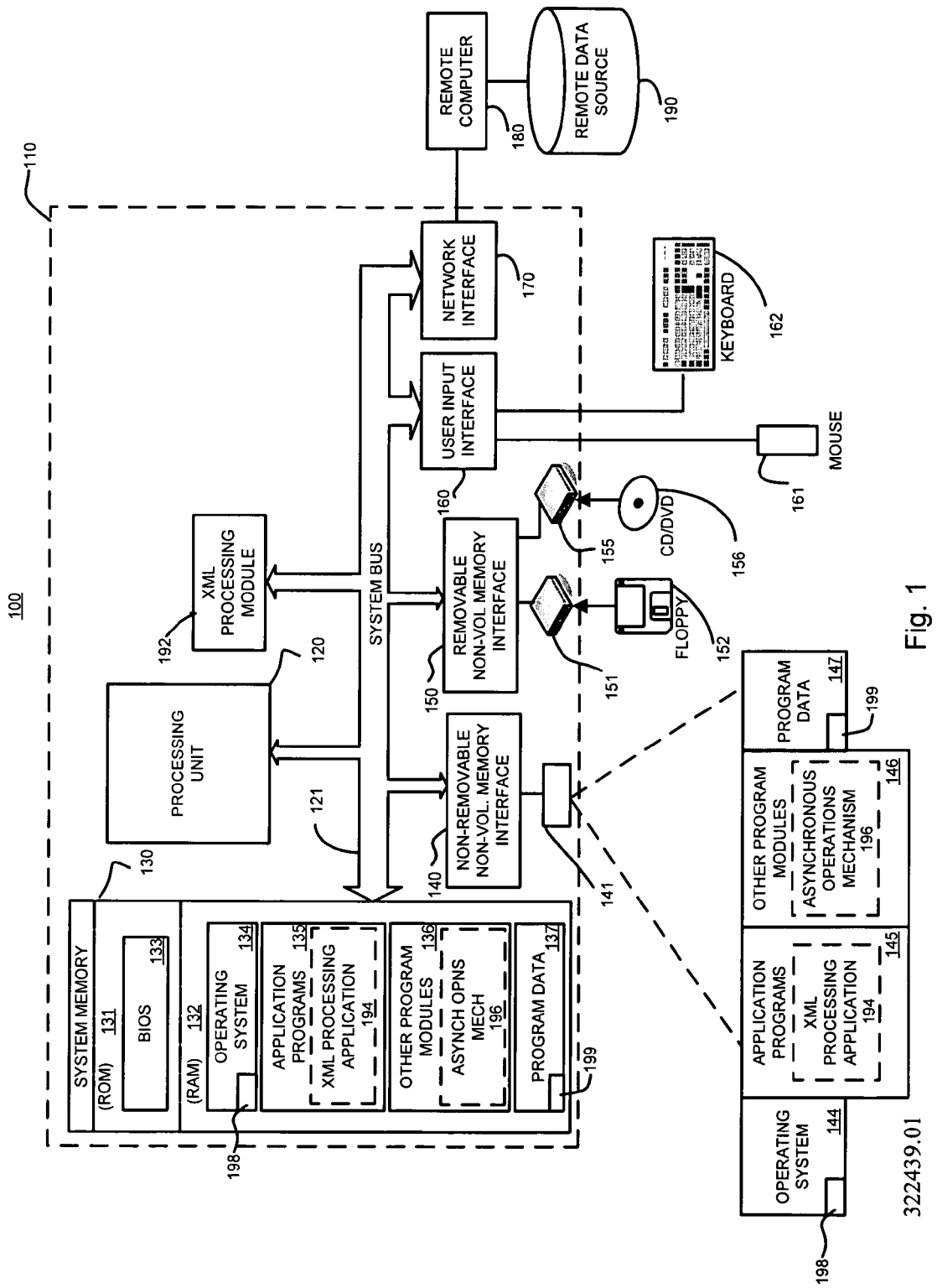
FIG. 1 may be an illustration of a computer that implements a method for XML document read and write processing.

FIG. 1 illustrates an example of a suitable computing system environment 100 that may operate to provide the method described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary computing environment 100.

With reference to FIG. 1, an exemplary computing environment 100 for implementing the blocks of the claimed method includes a general purpose computing device in the form of a computer 110. Components of the computer 110 may include, but are not limited to, a processing unit 120, a system memory 130, and a system bus 121 that couples various system components including the system memory 130, non-volatile memories 141, 151, and 155, remote data source 190, and XML processing module 192 to the processing unit 120.

The computer 110 may operate in a networked environment using logical connections to one or more remote computers, such as a remote computer 180 in communication with the remote data source 190, via a network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include an operating system 134, application programs 135 (e.g., an XML Processing Application 194), other program modules 136 (e.g., a general mechanism for performing asynchronous operations or an asynchronous operations API 196), and program data 137

The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150 and may contain data and/or program modules or storage for the data and/or program modules of the RAM 132 (e.g., an operating system 144, application programs 135 such as the XML Processing Application 194, other program modules such as the asynchronous operations API 196, program data 147, etc.).

Program data 137, 147 may include resources for the application programs and the other program modules, for example, a memory buffer 199 that may be filled by a read operation or flushed by a write operation to process an XML document, as will be further explained below. The buffer 199 may be a virtual memory space within some portion of computer memory. In some embodiments, the buffer 199 may be a contiguous or non-contiguous portion of volatile 132 or non-volatile memory 141, 151, 155, or a portion of a remote data source 190. The buffer 199 may also be shared between several components, including the read callback API 500 and the write callback API 550. Alternatively or additionally, the buffer 199 may be separate elements.

The XML processing application 194 and the asynchronous operations API 196 may also be components of the operating system 134, 144. The operating system 134, 144, may also include a process scheduler 198 that manages at least a portion of resources for the processing unit 120. For example, the computer 110 may execute only one process at any given time (e.g., processing I/O for multiple XML documents, etc.), using the scheduler 198 to guarantee that each executing process is given processing unit 120 time in sufficient quantities to keep executing. Each process running on the computer 110 may spawn individual tasks called execution threads, or simply threads. Some threads can spawn subordinate threads. It is common to have dozens, or even hundreds, of threads active at a given time. On the other hand, the computer may have a limited number of resources, such as disk storage or system or network I/O. Even though each resource may often support multiple threads, in many cases, a thread may have to wait for access to a given resource until a different thread releases it. In general, a number of threads may be spawned or created by a process scheduler 198 to perform processes (e.g., system I/O) as resources become available.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A display device (not shown) may also be connected to the system bus 121 via an interface, such as a video interface.

An XML processing module 192 may be implemented as in integrated circuit or other form of hardware device connected to the system bus 121. The XML processing module 192 may process XML documents from the program data 137, 147, the remote data source 190, or other sources in the same manner as the XML processing application 194 and may incorporate the asynchronous operations API 196, as described below. In other embodiments, the XML processing module 192 is a component of another element of the computer system 100. For example, the XML processing module 192 may be a component of the processing unit 120, and/or the remote computer 180.

Figure 2:
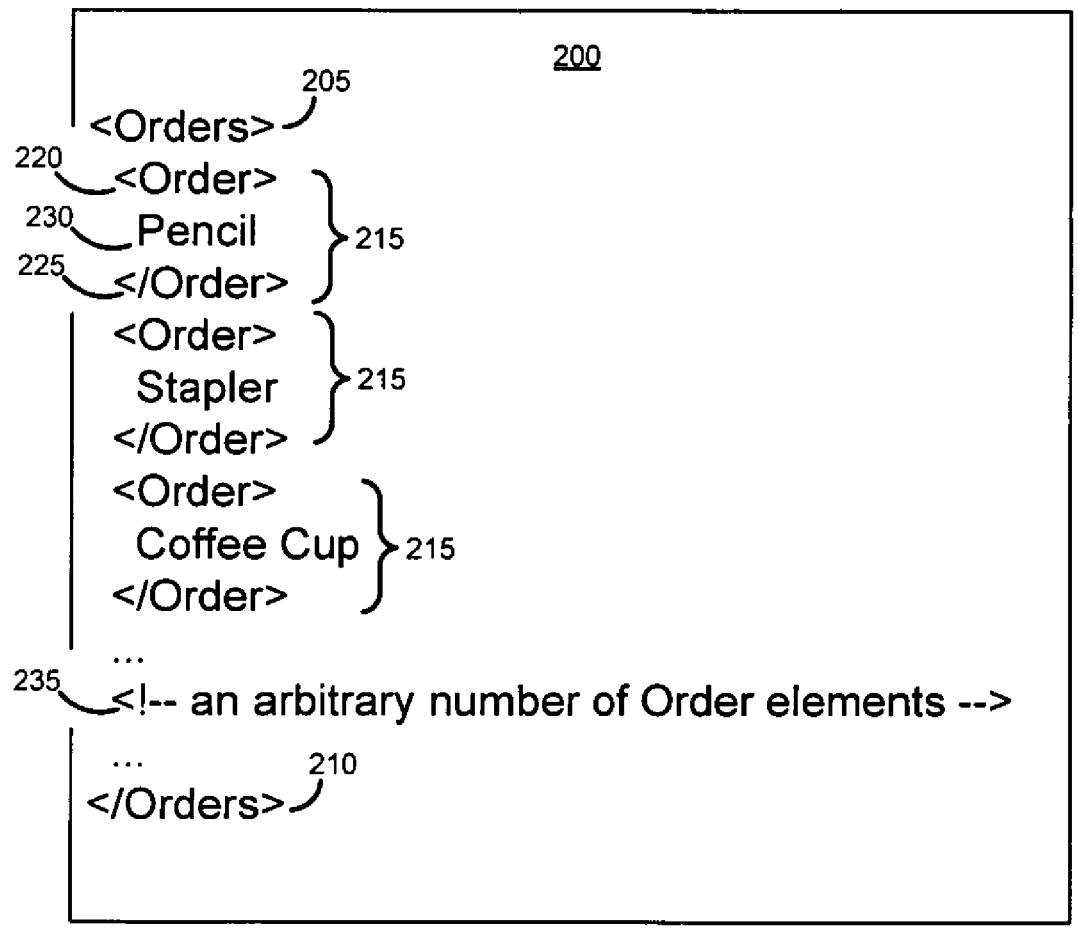
FIG. 2 may be an illustration of an XML document.
Figure 6:
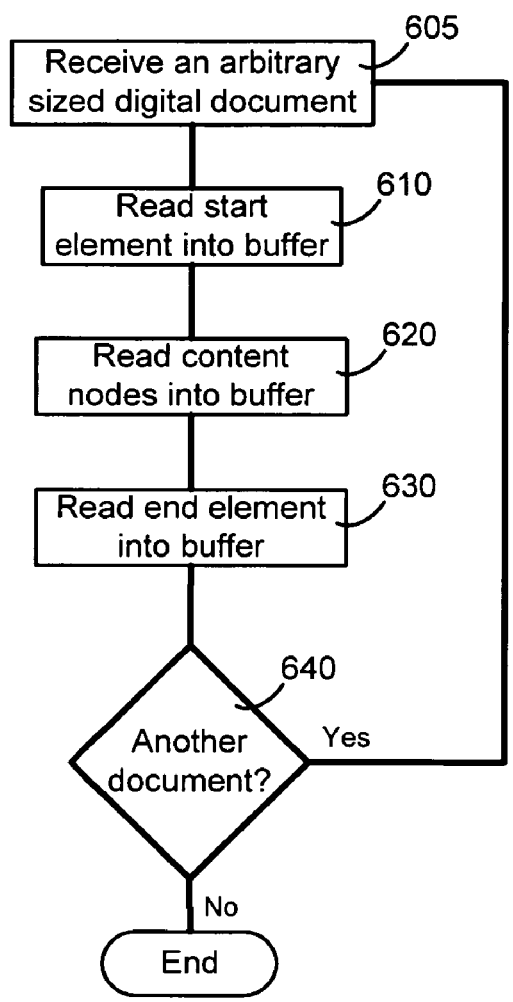
FIG. 6 may be an illustration of a method for reading an XML document.
Figure 7:
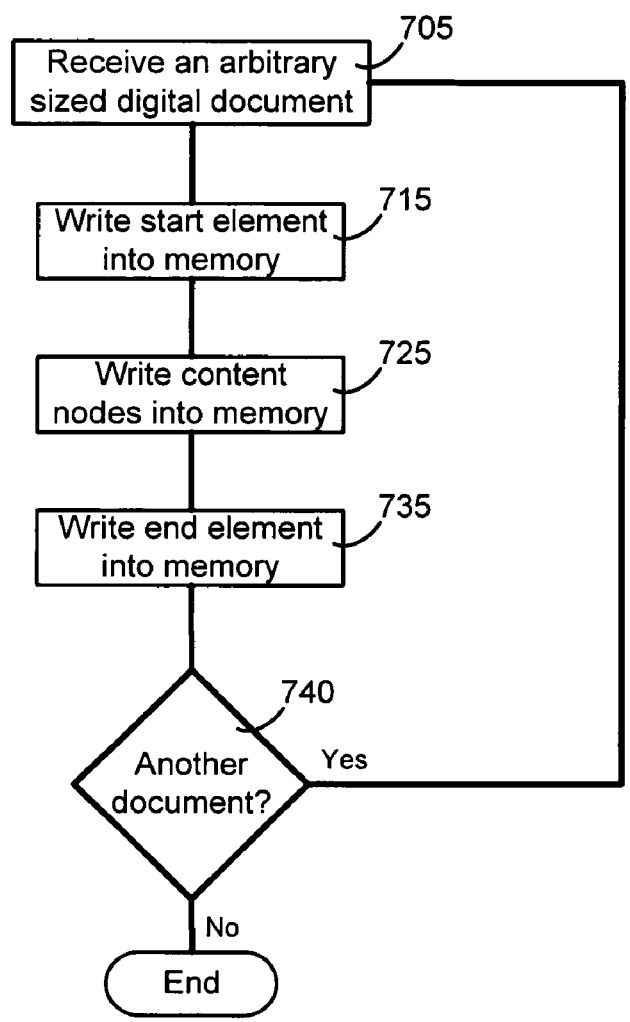
FIG. 7 may be an illustration of a method for writing an XML document.

As previously discussed, processing multiple XML documents or large XML documents typically blocks an execution thread while the system performs I/O and significantly reduces XML document processing scalability. FIG. 2 illustrates an exemplary XML document 200 with a number of elements including a document start-tag 205, a document end-tag 210, and any number of content elements 215 that each include an element start-tag 220, an element end-tag 225, and content node 230. As indicated by the XML comment at 235, the XML document 200 may have an arbitrary number of content elements 215. The XML document 200 is exemplary only and other digital documents, including other XML documents 200, may include a variety of different elements, attributes, and other parts as commonly understood in the art.

To process an XML document 200 using the XML processing module 192 or XML processing application 194, a read API 300 (FIG. 3a) may include a reader object 305 or other process that may read or consume the XML document 200 as received from, for example, a remote data source 190. The read API 300 may perform read operations concurrently with a write API 350 (FIG. 3b). A write API 350 may include a writer object 355 or other process that may write the XML document 200 to system memory 130 or other memory 141, 151, 155. Other embodiments of the read API 300 may consume the entire XML document 200 in the buffer 199 in one step. Similarly, the write API 350 may write the entire XML document 200 in one step, as well. Both the read API 300 and the write API 350 may, therefore, block threads until the system completes the I/O operation. Performing XML read or write operations in one step may reduce the time threads that process XML documents are blocked to perform I/O, but may also occupy system memory proportional to the size of the document. Thus, any XML document that is larger than physical memory may require more than one step.

The XML processing module 192 or XML processing application 194 may also incrementally process the XML document 200, one portion at a time. To incrementally perform XML document 200 processing, the read API 300 may consume or a write API 350 may write several portions of the XML document 200 and perform an I/O operation with each portion. In other words, the write API 350 may produce a series of bytes and the read API 300 may consume a series of bytes. These produced or consumed bytes may be written by the write API 350 and read by the read API at different times or may be transmitted over a communication protocol (e.g., TCP). The communication protocol may maintain the flow of bytes between the read API 300 and the write API 350. For example, while a write API 350 may write bytes of an XML document 200 to a TCP socket, a read API 300 may not necessarily be in communication with that socket. Similarly, a read API 300 may read bytes from a TCP socket, but the bytes may not necessarily be produced by a write API 350.

Using the XML document 200 as one example of a digital document that may be incrementally processed, the reader object 305 may read a start-tag 205 from a TCP socket and, concurrently, the writer object 355 may write a start-tag 205 into a system memory 130, a non-volatile memory 151, or other memory of the computer system 100. Both the read operation and the write operation may include an I/O operation that blocks a thread. Before encountering an end-tag 210, and while content elements 215 exist, the reader 305 may read content elements 215 and the writer 355 may write content elements 215 to memory as described above in relation to the start-tag 205. This "pull" method, where the write API 350 essentially pulls the XML document 200 data as it is needed, may block a thread until the entire XML document 200 is read and written into memory and I/O operations are complete.

With reference to FIGS. 2, 4a and 4b, the read API 300 (FIG. 3a) and the write API (FIG. 3b) may be modified to reduce the number of times an XML document processing thread is blocked to perform I/O. Incremental XML document processing APIs may perform system I/O and, thus, block an XML document processing thread only when one or more designated buffers 199 (FIG. 1) for the XML document data are full. In some embodiments, "Fill" and "Flush" APIs may be invoked once an I/O operation is complete, where the I/O operation may employ one or more buffers 199 described above in relation to FIGS. 3a and 3b. In other embodiments, the Fill and Flush APIs may be invoked after an I/O operation is complete where the I/O operation employs non-buffered I/O. The Fill API 410 may employ a system thread to read a portion of the digital document into the buffer 199. Similarly, the Flush API 460 may employ a system thread to write the portion of the digital document from the buffer 199 to the system memory. Further, the size of the one or more buffers 199 may be optimized to minimize the amount of time a thread is employed.

With reference to FIGS. 2 and 4a, to incrementally perform XML document 200 I/O while reducing thread blocking, a reader object 405 of the read buffer API 400 may initialize a buffer 199 with a Fill API 410 to a specified buffer size 415. The reader object 405 may then read a start-tag 205 of the XML document 200 into the buffer 199. Calling the Fill API 410 to read into the initialized buffer 199 may temporarily block the XML document processing thread until it completes a system I/O operation and returns. The buffer size 415 may be pre-set to conform to an expected size of the start-tag 205, or may be determined statically or dynamically by analyzing the XML document 200. The reader 405 object of the read buffer API 400 may also initialize a buffer 199 to another size 425 and call the Fill API 410 to read the content nodes 230 (i.e., the portions of the XML document 200 between the "<Order>" and "</Order>" tags, assigned to "product" 430 String in FIG. 4a) into the buffer 199. As before, reading into the buffer 199 may temporarily block a thread that is processing an XML document as it waits for an I/O system thread to return. Further, the buffer size 415 may be pre-set to conform to an expected total size of the content nodes 230, or may be determined statically or dynamically by analyzing the XML document 200. The reader 405 object may call the Fill API 410 to initialize the buffer 199 to read in an end-tag 210 for the XML document 200. The buffer size 435 may be determined as described above in relation to the buffer size 415.

With reference to FIGS. 2 and 4b, the writer 455 object of the write buffer API 450 may write the content nodes 230 into the system 100 memory. In some embodiments, the writer 455 object may call the Flush API 460 and write an amount 470 of the content nodes 230 from a buffer 199. For example, the amount written may be at least as much as the size of the data as represented in XML. The writer 455 object may call the Flush API 460 to write the content nodes from the buffer 199. In some embodiments, the amount of the buffer 199 written may be at least as much as the size of the content nodes as represented in XML. A writer object 455 of a write buffer API 450 may write a start-tag 205 from the buffer 199 by calling a Flush API 460 and writing the buffer amount 465 equal to the expected size of the data as represented in XML. Calling the Flush API 460 to write the contents of the buffer 199 may also temporarily block the XML document processing thread until the I/O operation is complete.

Thus, by incorporating one or more buffers 199 into which XML document 200 elements may be read to and written from by utilizing specialized "Fill" and "Flush" APIs, an XML document 200 may be processed while minimizing thread blocking caused by I/O.

With reference to FIGS. 2 and 5a, an embodiment may include a modified read buffer API 400 (FIG. 4a) to eliminate thread blocking. For example, a general mechanism for performing asynchronous operations or an asynchronous operations API 196 may be incorporated into the XML document 200 processing of the write callback API 550 to eliminate blocking a thread that is processing an XML document and may simultaneously process multiple XML documents. The asynchronous operations API 196 may allow XML processing to continue execution while system input and output are in progress, thus, computation and I/O may proceed simultaneously and in parallel. For example, any potentially asynchronous operation may invoke a callback function when the operation is complete rather than block the XML document processing thread for the duration of the I/O operation. In some embodiments, a reader object 505 of a read callback API 500 may initiate a Fill API 510 to initialize a buffer 199 of a size 515. The buffer 199 may be of a size 515 to accommodate the start-tag 205 of the XML document 200 and may be pre-determined or determined statically or dynamically by analyzing the XML document 200.

Upon invocation, the Fill API 510 may initiate an I/O operation and the read callback API 500 may be invoked once the I/O is complete (i.e., once the data is available). For example, a first read callback function 520 may be called once I/O is complete. The thread processing the XML document may then be further utilized after the Fill API 510 returns (i.e., the I/O is complete). For example, upon completion of the Fill API 510 and associated I/O (i.e., when the first read callback function 520 is notified), the function Read3A 520 may parse the start-tag 205 and verify that it is the expected start-tag 205 value.

Once the start-tag 205 is read into the buffer 19, the function Read3B 525 may be called to immediately continue processing the XML document. The reader object 505 may initialize a buffer 199 to a size 530. As previously described, the buffer 199 size 530 may be pre-determined or statically or dynamically determined based on an analysis of the XML document and, more particularly, based on the expected total size of the XML representation of the XML document content nodes 230. When the Fill API 510 completes any potential I/O, the read callback API 500 may initiate a second read callback function, for example, Read3C 535, and may read the content nodes 230 into the initialized buffer 199.

Once the second read callback function (Read3C) 535 completes reading the content nodes 230 into the buffer 199, the read callback API 500 may continue to read the end-tag 210 into a buffer 199 using callback function 545. The buffer 199 size and the amount read into the buffer 199 by the read callback API 500 may be pre-determined or statically or dynamically determined by analyzing the XML document. By providing the "Fill" API coupled with an asynchronous operations API 196, the XML processing thread may remain unblocked while the system, simultaneously and in parallel, processes multiple, arbitrary sized XML documents 200.

With reference to FIGS. 2 and 5b, a further embodiment may include a modified write buffer API 450 (FIG. 4b) to eliminate thread blocking. For example, a general mechanism for performing asynchronous operations or an asynchronous operations API 196 may be incorporated into the XML document 200 processing of the write callback API 550 to eliminate blocking a thread that is processing an XML document and may simultaneously process multiple XML documents. The write callback API 550 may begin operation and continue I/O and the XML document processing thread may continue processing. Because the thread processing the XML document 200 is not blocked, multiple XML documents 200 may be processed simultaneously.

Upon invocation, the Flush API 560 may initiate an I/O operation and the write callback API 550 may be invoked once the I/O is complete (i.e., once the data has been written). For example, a first write callback function 570 may be called once I/O is complete. The thread processing the XML document may then be further utilized after the Flush API 560 returns (i.e., the I/O is complete). For example, upon completion of the Flush API 560 (i.e., when the first write callback function 570 is notified), the function Write3A 570 may start writing the next element.

The writer object 555 of the write callback API 550 may write a start-tag 205 and initiate the Flush API 560 to write the buffer 199. In some embodiments, a first write callback function 570 may also be called by the Flush API 560 when the I/O is complete without blocking the XML document processing thread or otherwise waiting for the I/O to complete. For example, upon completion of the Flush API 560 (i.e., writing the start-tag 205 from the buffer 199), the function Write 3A 570 may be called. In short, XML document processing may continue without being idle until the write callback API 550 completes. Other instances of the write callback API 550 may continue to write multiple XML documents 200 to memory while other XML document processing operations continue.

The function Write3A 570 may continue to write the content nodes 230 to the system 100 memory. Once the Write3A 570 function (i.e., the write callback function) completes writing the content nodes 230, the write callback API 550 may continue to write the end-tag 210 out of a buffer 199 570. The buffer 199 size and the amount written out of the buffer 199 by the write callback API 550 may be pre-determined or statically or dynamically determined by analyzing the XML document. By providing the "Flush" APIs coupled with an asynchronous operations API 196, the XML processing thread may not be blocked while the system, simultaneously and in parallel, processes multiple, arbitrary sized XML documents 200.

With reference to FIGS. 2, 5a, 5b, 6, 7, and 8 the XML Processing Application 194 or XML Processing Module 196 may also be described as a method 600 including several blocks describing tasks that may be performed in any order. For example, as previously described, the asynchronous operations API 196 may provide a mechanism for the XML document processing thread controlling the execution of the XML processing Application 194 or module 192 to remain unblocked. XML document 200 processing may proceed simultaneously and in parallel with multiple XML documents 200. For example, multiple instantiations of the APIs described above and the methods described below may process multiple XML documents simultaneously and in parallel, as illustrated in the timeline 800 of FIG. 8. Therefore, some or all of the following blocks described in FIGS. 6 and 7 may be executed simultaneously and in parallel or serially.

The method 600 may describe an efficient, non-blocking mechanism for incrementally processing arbitrary sized XML documents. At block 605, a computer 110 may receive an arbitrary sized digital document 200. In some embodiments, the document 200 is an XML document including a start-tag 200, an end-tag 205 and an arbitrary number of content elements 215 each including an element start-tag 220, an element end-tag 225, and content node 230. Of course, any digital document including encoded text or other content to control its structure, formatting, or the relationship among the document's parts may be processed by the method 600.

At block 610, the method 600 may read the start-tag 220 into a buffer 199. In some embodiments, the block 610 may initiate a Fill API 510. For example, the Fill API 510 may include initializing a buffer 199 that is sized according to an expected size 515 of an XML document 200 start-tag 205 or other element that signals the beginning of a digital document. As previously described, the size 515 of the buffer 199 may be determined statically or dynamically to optimize XML document 200 processing or to minimize any obstruction in XML document processing. Some examples of XML document obstructions, malicious or not, include start-tags 205 or other XML document 200 elements with large amounts of white space, unnecessary characters or elements that cannot be parsed, other malicious techniques, or unintended or intentional errors by the document 200 author or another party. The buffer 199 may be a virtual memory space within some portion of computer memory. In some embodiments, the buffer 199 may be a contiguous or non-contiguous portion of volatile 132 or non-volatile memory 141, 151, 155, or a portion of a remote data source 190. The buffer 199 may also be shared between several components, or may be separate elements that are in communication.

Upon initializing the buffer 199 and completing an I/O operation including the start tag 200, block 610 may also initiate a first read callback function 520. In some embodiments, the first read callback function 520 is facilitated by an asynchronous operations mechanism 196 and any potentially asynchronous operation may provide a callback function to invoke when a previous operation is complete. For example, the first read callback function 520 may be invoked when the asynchronous operation of block 610 is complete. The XML document processing thread may, therefore, continue immediately without being blocked and multiple XML documents 200 may be processed. The first read callback function 520 may read the start-tag 205 into the buffer 199 or another function to facilitate XML document processing.

At block 620, the method 600 may perform an I/O operation by reading the content nodes 230 of the XML document 200 into the buffer 199. In some embodiments, block 620 may utilize a function 525 to initialize or re-initialize a buffer 199 and read the content nodes 230 into the buffer 199. For example, the function 525 may include the Fill API 510 as described above in relation to block 610 as well as instructions to initialize the buffer 199 to a size as described above. Without blocking a thread processing the XML document, the method 600 may begin a second read callback function 535 upon completion of the I/O operation. The second read callback function 535 may include a conditional loop of instructions such that, so long as the XML document 200 includes a content node 230 surrounded by an element start-tag 220 and an element end-tag 225, a content node 230 may be read into the initialized or re-initialized buffer 199. Else, the second read callback function 535 may proceed to processing the XML document 300 end-tag 210.

At block 630, the method 600 may read an end-tag 210 of the XML document 200 into the buffer 199. In some embodiments, block 630 may utilize a function 540 including a third read callback function 545 upon completion of an I/O operation, for example, initializing or re-initializing a buffer 199 and reading the end-tag 210 into the buffer 199. For example, the fourth read callback function 540 may, after initializing the buffer 199 to a size as described above, begin the third read callback function 545.

At block 640, the method 600 may determine if another digital document is available for processing. In some embodiments, the method 600 receives a second XML document 200 or other digital document that may be processed. If, at block 640, the method 600 determines another document needs to be processed, then the method 600 returns to block 605. If the method 600 determines that no other documents are available for processing, then the method may end or wait until another XML document becomes available.

The method 700 may also describe an efficient, non-blocking mechanism for incrementally processing arbitrary sized XML documents. At block 705, a computer 110 may receive an arbitrary sized digital document 200. In some embodiments, the document 200 is an XML document including a start-tag 200, an end-tag 205 and an arbitrary number of content elements 215 each including an element start-tag 220, an element end-tag 225, and content node 230. Of course, any digital document including encoded text or other content to control its structure, formatting, or the relationship among the document's parts may be processed by the method 700.

At block 715, the method 700 may complete an I/O operation by writing a start-tag 205 into memory. In some embodiments, a writer object 555 writes the start-tag 205 to a portion of the system memory. The writer object 555 may then initiate a Flush API 560 to write the buffer 199 and to initiate an I/O operation to write the start-tag. Without blocking a thread processing the XML document, block 715 may also initiate a write callback function 570 upon completion of the I/O operation.

At block 725, the method 700 may write the content nodes 230 to the system memory or other component as dictated by I/O operation. In some embodiments, the content nodes 230 may be processed from the buffer 199 to the system memory. For example, the write callback function 570 may be invoked upon completion of the I/O operation and include a conditional loop of instructions such that, so long as the buffer 199 includes a content node 230 surrounded by an element start-tag 220 and an element end-tag 225, a content node 230 may be written to the system memory using a function 575. Else, the write callback function 570 may proceed to processing an end-tag 210.

At block 735, the method 700 may complete another I/O operation by writing the end-tag 210 to the system memory. In some embodiments, the end-tag 210 may be processed from the buffer 199 to the system memory by the function 580. For example, the function 580 may include an instruction to write the end-tag to the system memory using the Flush API 560. The function 580 may clear the buffer 199 initialized at block 630.

At block 740, the method 700 may determine if another digital document is available for processing. In some embodiments, the method 700 receives a second XML document 200 or other digital document that may be processed by the I/O system thread. If, at block 740, the method 700 determines another document needs to be processed, then the method 700 returns to block 705. If the method 700 determines that no other documents are available for processing, then the method may end.

Thus, documents in a digital format, such as multiple XML documents, may be processed simultaneously and in parallel by the computer system 100 using a reader callback API 500, a writer callback API 550, and employing asynchronous I/O techniques without blocking threads that process the XML documents.

Much of the inventive functionality and many of the inventive principles described herein are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein may be readily capable of generating such software instructions, programs, and ICs with minimal experimentation. Therefore, in the interest of brevity and minimization of any risk of obscuring the principles and concepts in accordance to the present invention, further discussion of such software and ICs, if any, may be limited to the essentials with respect to the principles and concepts of the preferred embodiments.

The invention claimed is:

1. A system for processing an XML document, comprising:
an input/output device comprising:
   a buffer component configured to:
      initialize a first buffer for processing an XML document;
   a reader object configured to:
      perform a read I/O operation for a first element of the XML document to read the first element into the first buffer; and
      invoke a read callback to a first thread, configured to process the XML document, upon completion of the read I/O operation;
   a writer object configured to:
      perform a write I/O operation for a second element within the first buffer to write the second element from the first buffer into system memory; and
      invoke a write callback to a second thread, configured to process the XML document, upon completion of the write I/O operation, the input/output device configured to provide concurrent processing of the XML document by the first thread and the second thread, without blocking the first thread and the second thread, utilizing at least one of the read callback or the write callback;

a second reader object configured to process a second XML document in parallel with the reader object processing the XML document, the second reader object instantiated concurrently with the reader object; and a second writer object configured to process a third XML document in parallel with the writer object processing the XML document, the second writer object instantiated concurrently with the writer object.

2. The system of claim 1, the buffer component configured to:
determine a first expected size of the first element within the XML document; and
allocate a first buffer size for the first buffer based upon the first expected size.

3. The system of claim 2, the buffer component configured to:
dynamically adjust the first buffer size based upon one or more elements that are to be read into the first buffer.

4. The system of claim 1, the buffer component configured to initialize a second buffer for processing the XML document, and the reader object configured to read a third element of the XML document into the second buffer.

5. The system of claim 4, the buffer component configured to:
determine a second expected size of the third element within the XML document; and
allocate a second buffer size for the second buffer based upon the second expected size, the second buffer size different than a first buffer size designated for the first buffer.

6. The system of claim 1, the read I/O operation and the write I/O operation performed asynchronously.

7. The system of claim 1, the writer object configured to:
invoke a flush API to initiate the write I/O operation.

8. The system of claim 1, the second XML document different than the third XML document.

9. The system of claim 1, the second XML document the same as the third XML document.

10. The system of claim 1, the input/output device configured to:
receive the XML document from a remote data source over a network.

11. The system of claim 1, the write callback in communication with the read callback.

12. The system of claim 11, the writer object configured to:
invoke the write callback to pull the first element from the read callback via the first buffer.

13. The system of claim 1, the buffer component configured to:
identify an obstruction within the first element;
remove the obstruction from the first element to create a modified first element; and
allocate a first buffer size for the first buffer based upon a size of the modified first element.

14. The system of claim 13, the obstruction comprising at least one of an unnecessary character or an invalid character.

15. The system of claim 1, the first element comprising at least one of a start-tag, an end-tag, or a content node.

16. A method for processing an XML document, comprising:

initializing a first buffer for processing an XML document;
performing, via a reader object, a read I/O operation for a first element of the XML document to read the first element into the first buffer;
invoking, via the reader object, a read callback to a first thread, configured to process the XML document, upon completion of the read I/O operation;
performing, via a writer object, a write I/O operation for a second element within the first buffer to write the second element from the first buffer into system memory;
invoking, via the writer object, a write callback to a second thread, configured to process the XML document, upon completion of the write I/O operation, the first thread and the second thread concurrently processing the XML document, without being blocked, based upon at least one of the read callback or the write callback;
processing, via a second reader object, a second XML document in parallel with the reader object processing the XML document, the second reader object instantiated concurrently with the reader object; and
processing, via a second writer object, a third XML document in parallel with the writer object processing the XML document, the second writer object instantiated concurrently with the writer object.

17. The method of claim 16, comprising:
dynamically adjusting a first buffer size allocated to the first buffer based upon one or more elements that are to be read into the first buffer.

18. The method of claim 16, the performing a read I/O operation comprising invoking a fill API to initiate the read I/O operation, and the performing a write I/O operation comprising invoking a flush API to initiate the write I/O operation.

19. The method of claim 16, comprising:
invoking the write callback to pull the first element from the read callback via the first buffer.

20. A computer-readable storage memory comprising processor-executable instructions that when executed perform a method for processing an XML document, comprising:
initializing a first buffer for processing an XML document;
performing, via a reader object, a read I/O operation for a first element of the XML document to read the first element into the first buffer;
invoking, via the reader object, a read callback to a first thread, configured to process the XML document, upon completion of the read I/O operation;
performing, via a writer object, a write I/O operation for a second element within the first buffer to write the second element from the first buffer into system memory;
invoking, via the writer object, a write callback to a second thread, configured to process the XML document, upon completion of the write I/O operation, the first thread and the second thread concurrently processing the XML document, without being blocked, based upon at least one of the read callback or the write callback;
processing, via a second reader object, a second XML document in parallel with the reader object processing the XML document, the second reader object instantiated concurrently with the reader object; and
processing, via a second writer object, a third XML document in parallel with the writer object processing the XML document, the second writer object instantiated concurrently with the writer object.

* * * * *